Oct. 12, 1937.   R. R. ERBE ET AL   2,095,467
AUTOMATIC PHONOGRAPH
Filed March 30, 1936   4 Sheets-Sheet 1

INVENTORS.
RALPH R. ERBE.
IRVIN C. HUNTER.
BY
Lockwood Goldsmith & Galt
ATTORNEYS.

Oct. 12, 1937.    R. R. ERBE ET AL    2,095,467
AUTOMATIC PHONOGRAPH
Filed March 30, 1936    4 Sheets-Sheet 3

INVENTORS.
RALPH R. ERBE,
IRVIN C. HUNTER.
BY
Lockwood Goldsmith Galt
ATTORNEYS.

Oct. 12, 1937.　　　R. R. ERBE ET AL　　　2,095,467
AUTOMATIC PHONOGRAPH
Filed March 30, 1936　　　4 Sheets-Sheet 4

INVENTORS.
RALPH R. ERBE.
IRVIN C. HUNTER.
BY Lockwood Goldsmith & Galt
ATTORNEYS.

Patented Oct. 12, 1937

2,095,467

UNITED STATES PATENT OFFICE 2,095,467

AUTOMATIC PHONOGRAPH

Ralph R. Erbe and Irvin C. Hunter, Fort Wayne, Ind., assignors, by mesne assignments, to The Capehart, Incorporated, Fort Wayne, Ind., a corporation of Indiana Application March 30, 1936, Serial No. 71,550

8 Claims. (Cl. 274—10)

This invention relates to an automatic record changing phonograph of the selective type having a magazine for storing a number of records together with mechanism for selectively withdrawing a record for reproduction and then returning it to the magazine when played, reference being had to the copending application of Ralph R. Erbe Serial No. 10,441, filed March 11, 1935, for "Automatic phonograph".

In conjunction with the features disclosed and claimed in the above-mentioned application, the principal object of this invention is to provide a selector and selecting mechanism which will mechanically select records to be reproduced, as distinguished from their being electrically selected as disclosed in the above-mentioned application. The mechanism of the mechanical selector and selecting mechanism is more economical and considerably cheaper to build than the electrically-controlled selecting mechanism, such as disclosed in the above-mentioned application, and, therefore, is preferable. However, wherein a mechanical selector has been heretofore employed, it has been necessary that such a selector be located on the phonograph cabinet on a level with and adjacent to the selecting mechanism, which mechanism is generally below the turntable. This means that the user, in operating the selector, must bend down in an inconvenient position to pick out the selecting buttons. It is, therefore, more convenient for the user, and accordingly pays better in a coin-operated machine, to position the selector with the selecting push buttons at the average height of the eyes of the user,— preferably on the top edge of the phonograph cabinet instead of below the turntable.

This invention has for its purpose to provide a selecting mechanism which may be mechanically actuated by a remotely positioned selector. Thus, the selecting mechanism may be as usually located below the turntable, whereas the selector may be remotely positioned at a distance considerably above the turntable or near the top of the cabinet.

Another feature of the invention resides in providing the selecting mechanism with means for progressively actuating it to the end that the records in the magazine will be played in their regular order of sequence where no selections are made by the selector. Thus, as disclosed in the above-mentioned application, wherein no selection was made, the record last played would be repeated. As distinguished therefrom, the present invention contemplates that instead of repeating the previous record, the next following record will be played. In fact, where no selection is made and the playing is continued, all the records in the magazine will be played in their order continuously.

Still a further feature of the invention resides in the mechanism for arresting and locking the selecting mechanism at the proper position to operate a selected record or a succeeding record, as the case may be, and hold the mechanism in a predetermined position during the time that the record is removed from the magazine, reproduced and replaced in position.

The full nature of the invention will be understood from the accompanying drawings and the following description and claims:

The record changing and reproducing mechanism is briefly and generally illustrated, reference to details thereof being made to the above-mentioned application. However, there is illustrated herein certain mechanism of the machine which is mounted upon a stationary deck plate 20 suitably supported in any manner within the usual phonograph cabinet, not shown. Beneath said deck plate there is suspended the usual electric motor 21, which rotates a vertical stem 22 extending upwardly through the deck plate 20. The usual rotatable turntable 23 is carried upon said stem and is rotated thereby, the upper end of said stem forming a centering pin for centering records upon the turntable.

A record storage magazine 24 is mounted upon the upper end of a member 25, which is slidably supported beneath the deck plate 20 and extends upwardly through an opening 26 therein. The magazine is provided with side plates 27, partition plates 28 and a bottom plate 29. The bottom plate 29 extends about the lower surface of the side plates 24 and extends upwardly and outwardly a short distance at the left of the magazine, as viewed in Fig. 1, and the opposite end thereof as viewed in Fig. 2, but at the other side of the magazine toward the turntable it leaves the side plates free for removal of the record. It will be apparent that the magazine is adapted to hold a record 30 on edge in each of the compartments formed by the partitions 28, and that the records will normally rest in the magazine because of the upward inclination of the bottom plate 29. However, a record may be removed from the magazine by rolling the same to the right toward the turntable along the bottom plate.

The machine is provided with the usual pick-up arm 32 carrying a stylus 33 which engages a record upon the turntable for reproducing the same. The stylus is associated with the usual pick-up mechanism carried by the pick-up arm 32, but not shown in the drawings. The said pick-up arm may be connected to any suitable form of amplifier and reproducer. The pick-up arm is pivotally mounted at 34 upon lugs carried on the upper end of a rotatable bushing 36. The arm may thus be raised by movement about the pivot 34 to remove the stylus from the record and may be oscillated by movement of the bushing 36 to permit the stylus to follow the record groove and return the same to starting position.

In the automatic operation of the phonograph, when a record has been completely reproduced, the pick-up arm is raised and moved counterclockwise to clear the record, the record is removed from the turntable and placed in its proper compartment in the magazine, a newly selected record is removed from the magazine and placed on the table, the pick-up arm is moved to a position above the starting point of the new record, and the stylus is lowered into playing position thereon. The mechanism by which these automatic movements are produced will be referred to herein, but particular reference thereto may be made to the above-mentioned copending application.

*Power drive for automatic mechanism*

Figure 3:
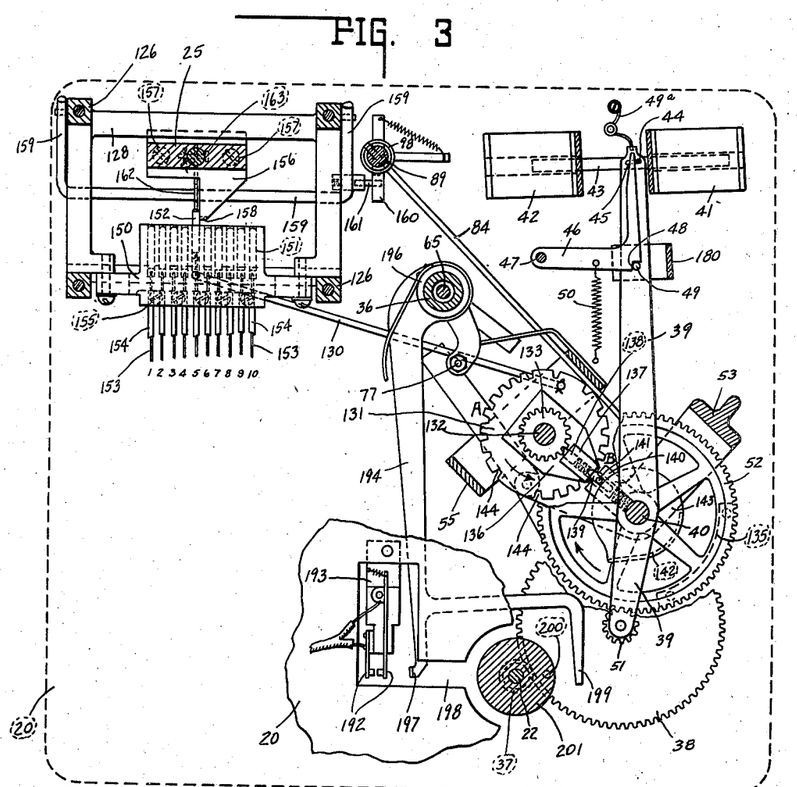
Fig. 3 is a plan view partly in section and with parts removed to show other parts in detail with respect to the driving and selecting mechanism.

The stem 22, which is continuously driven by the motor 21, carries a pinion 37 which is adapted to mesh with a gear 38 rotatably mounted upon one end of a clutch lever 39 (Fig. 3). The clutch lever 39 is freely mounted upon a vertical shaft 40 and extends to a position between a pair of solenoids 41 and 42. Said solenoids are suitably supported beneath the deck plate 20 and are shown in Fig. 3. Said solenoids have a common armature 43 carrying a pin 44 engaging a slotted opening 45 in the end of the clutch lever 39. It will be apparent that when the solenoid 41 is energized, it will move the armature 43 and clutch lever 39 to move the gear 38 into mesh with the pinion 37. The lever 39 is locked in this position by a locking member 46 pivotally mounted at 47 on the under surface of the deck plate 20. Said locking member is provided with a notch 48 engaging a pin 49 carried by the clutch lever 39, and is urged into locking position by a tension spring 50. In locked position, as shown in Fig. 3, the locking member prevents accidental movement of the clutch lever to disengage the gear 38 from the pinion 37, even though solenoid 41 is deenergized. An overcenter spring 49a has one end anchored to the deck plate 20 and the opposite end engaging a suitable recess in the end of lever 39 and aids in retaining the lever 39 at either of its extreme positions.

When the solenoid 41 has been deenergized and solenoid 42 energized, the armature 43 is drawn to the right, pressing the pin 44 against the tip of the locking lever 46, and thus moving the locking lever from locking position. When the notch 48 in said lever has cleared the pin 49, the pin 44 reaches the end of the slotted opening 45, and the further movement of the armature 43 moves the clutch lever 39 to disengage the gear 38 from the pinion 37. All of the automatic movements of the machine are driven through the gear 38 and thus the actuation of solenoid 41 initiates the automatic movements and the actuation of solenoid 42 arrests the same.

A pinion 51 is also carried by the clutch lever 39 and is formed integrally with the gear 38. Pinion 51 meshes with a gear 52 which is secured to the shaft 40 and is, therefore, always in mesh with pinion 51 irrespective of the position of the clutch lever 39. The shaft 40 is carried by a bearing bracket 53 secured to the under surface of the deck plate 20, and finds a lower bearing in a member secured to the lower end of a U-shaped bracket 55 also supported by said deck plate. The shaft 40 is rotated as long as the pinion 37 and gear 38 are in mesh. The automatic movements are so timed that one complete revolution of the shaft 40 completes the cycle of operation and returns the parts to initial position.

*Tone arm elevating and lowering mechanism*

Figures 2, 8:
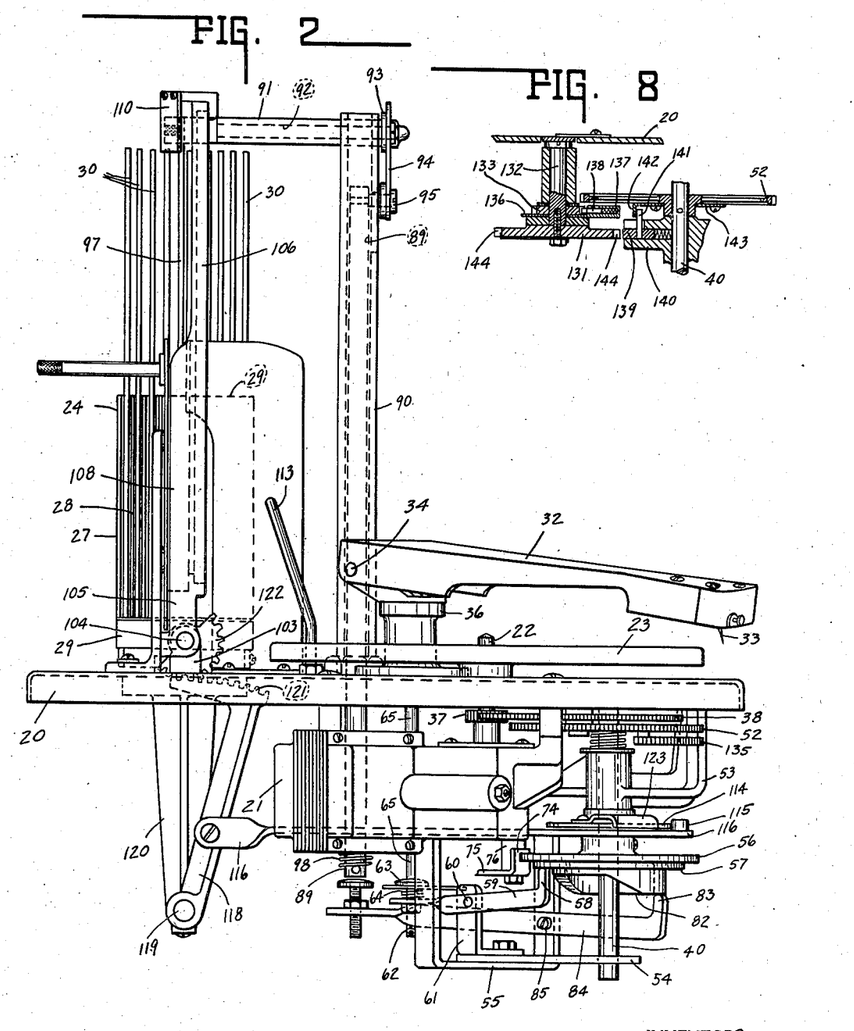
Fig. 2 is an elevational view of the left side of the machine with the parts in record changing position.
Fig. 8 is a section taken on the line 8—8 of Fig. 6.

The shaft 40 has secured thereto a master cam 56 (Fig. 2). Said cam is provided on its lower face with a cam track 57 which is engaged by the upturned end 58 of a lever 59. Said lever finds a pivot 60 in an angle bracket 61 mounted upon the bracket 55. The opposite end of the lever has freely mounted therein a vertical stud 62 having a head 63 formed thereon. A spring 64 normally urges said stud upwardly against the lower end of a vertical pin 65 which extends upwardly through the bushing 36 and engages the pick-up arm.

In the normal or playing position of the mechanism, the end of the lever 59 engages a notch in the cam track 57. The opposite end is, therefore, at its lowermost position and permits the stylus to engage the record. As soon as the rotation of the master cam 56 has commenced, the end of the lever 59 is pressed downwardly by a sloping portion of the cam track 57, and the pin 65 and pick-up arm are elevated to raise the stylus from the record. The cam track 57 is established to maintain the stylus in its elevated position until the master cam has made nearly a complete revolution, whereupon the end of the lever 59 engages a second inclined portion on the cam track which permits the stylus to be lowered into engagement with the new record.

*Mechanism for horizontal movement of the pick-up arm*

The outer edge of the master cam 56 is formed as a cam track which is engaged by an upturned end 74 of a lever 75 (Fig. 2). The lever 75 is pivotally mounted upon a bearing 76 formed integrally with the bracket 53. The opposite end of the lever engages a vertical pin 77 which is clamped to the lower end of the bushing 36. In the normal or playing position of the mechanism, the end of the lever 75 rests at a notch provided in the edge of the master cam 56. When the rotation of the master cam has been started by engagement of the gear 38 with the pinion 37 and has progressed sufficiently to remove the stylus from the record, the end of the lever 75 engages an inclined portion of the master cam and is rocked thereby, carrying with it the bushing 36 and the pick-up arm 32. The shape of the master cam is such that the pick-up arm is moved entirely clear of the record for permitting removal thereof.

During the latter portion of this movement, the pin 77 engages a leaf spring mounted upon the bracket 55. As the master cam 56 approaches the end of a complete revolution, the lever 75 is brought into engagement with a portion thereof which is somewhat reduced in diameter and permits the leaf spring to move the pin 77 sufficiently to move the stylus over the starting point of a new record which has meanwhile been placed upon the turntable. While the pick-up arm is held in this position, the stylus is lowered onto the record, as previously described. When a single revolution of the master cam is complete, the notch therein is again opposite the end of the lever 75 which is slowly moved into the notch by the movement of the stylus in following the record groove inwardly upon the record.

Mechanism for moving the record from the magazine

The master cam is provided on its under surface with a cam track 82 which is engaged by the upturned end 83 of a lever 84 pivotally mounted at 85 on the bracket 55. The opposite end of the lever engages the lower end of a vertical rod 89. The rod 89 extends upwardly through a tube 90 mounted upon the deck plate 20. The tube 90 has secured to its upper end a second tube 91 extending horizontally over the magazine. The tube 91 carries a stem 92 rotatable therein. The stem 92 carries at one end an arm 93 which is connected with the rod 89 through a link 94 by a connecting pin 95. A finger 97 is secured to the opposite end of the stem 92 and is adapted to move over the magazine between the plates 28 to engage the edge of the record and push it therefrom as the stem 92 is oscillated within the tube 91. The rod 89 is normally maintained in contact with the lever 84 by a compression spring 98.

In the normal or playing position of the mechanism, the end of the lever 84 rides upon the lowermost portion of the cam track 82. The rod 89 is, therefore, pushed upwardly against the action of the spring 98. The finger 97 occupies the space from which a record has previously been removed for playing. During the rotation of the master cam 56, the lever 84 is engaged by an upwardly-inclined portion of the cam track, which permits the rod 89 to be forced downwardly by the spring 98. This movement oscillates the stem 92 and the finger 97. At this time the record which has been played, is being rolled back into the magazine, as will be hereinafter described, and said record is gently lowered into its proper place therein. The magazine is then moved by mechanism to be hereinafter described to position another record opposite said finger, and thereafter the lever 84 is engaged by the downwardly-inclined portion of the track 82. The consequent movement of the lever 84 again pushes the rod 89 upwardly, causing finger 97 to be rocked toward the turntable to roll a new record from the magazine along the bottom plate 29 thereof.

Record transfer mechanism

Mounted upon the top of the deck plate 20 there is a pair of bearings 103 supporting a rock shaft 104. The rock shaft 104 carries a transfer cradle 105 secured thereto. The cradle consists of a ring or annulus 106 having an outside diameter approximately that of the records 30 and having its inside diameter represented by the broken line 107, sufficiently large so that it may pass about the turntable 23. The cradle is provided with a rim 108 about a portion thereof and with a trackway 109 upon which the records may roll in entering or leaving the cradle.

The position of the cradle for positioning the record from the magazine and for returning the same thereto is shown in Fig. 2. In this position the trackway 109 forms a continuation of the bottom plate 29 of the magazine, and the record is rolled by the finger 97 along said trackway until it comes to rest against the rim 108. The record in this movement is guided into position by means of a guide plate 110 secured to the ring 106 at its upper side when in vertical position.

While the record is held in place by the finger 97, the shaft 104 is oscillated by means hereinafter described, to lower the cradle from its upright to its horizontal position. In this movement, the record is prevented from rolling from the cradle by means of a curved rod 113 secured to the deck plate 20. The downward movement of the cradle places the record upon the turntable with its centering hole engaging the centering pin 22. In this movement, the ring 106 passes below the level of the table, leaving a record resting thereon in the normal manner.

When the playing of the record has been completed, the shaft 104 is again oscillated to raise the cradle, picking the record up and removing it from the turntable. Upon reaching the upright position, the cradle is free to rest with the record resting at its edge against the finger 97 which, upon retraction, permits the record to roll back into place in the magazine.

The oscillation of the shaft 104 is controlled by a cam 114 carried upon the shaft 40. Said cam engages a roller 115 carried upon a link 116, the opposite end of which is pivotally connected to a quadrant arm 118 which in turn is pivotally mounted by a pin 119 upon a bracket 120 secured to the deck plate 20. The arm 118 carries a quadrant gear 121, at its upper end, the teeth of which mesh with a gear 122 carried upon the shaft 104. The cam 114 is so shaped that it forces the roller 115 and link 116 to the right at the proper time to raise the cradle 105. The cam carries a guide element 123 which has a downwardly extending lip positioned to engage the outer edge of the roller and force the same at the proper time to lower the cradle 105 toward the turntable.

The above-described mechanism is substantially the same as that more fully set forth and described in the above-mentioned copending application, and upon which no claim of invention is made herein, its description being merely for the purpose of generally explaining the operation of the record changing mechanism, which the new and novel selecting mechanism and selector hereinafter described is adapted to control.

Selective mechanism

For selecting the record or records to be played, the magazine is horizontally moved to bring the desired record opposite the finger 97. For this purpose, the member 25, which carries the magazine, is slidably mounted at one side upon a guide bar 125 carried upon a hanger 126 secured to the under surface of the deck plate 20. The other side of the member 25 is provided with roller bearings 127 which roll in a track 128, which is likewise supported upon the hanger 126. The member 25 is provided with a tongue 129 to which a link 130 is pivotally connected, the opposite end of said link being pivotally connected with a disk 131 freely mounted upon a pin 132, said pin being in turn secured to a boss on the under side of the deck plate 20. A pinion 133 is likewise freely mounted upon the pin 132, and a friction washer of cork or other suitable material is interposed between pinion 133 and the disk 131. A suitable spring washer or similar means surrounds the pin 132 above the pinion 133 to press the pinion downwardly against the cork washer so as to produce frictional engagement by means of which the disk 131 is frictionally rotated by the pinion 133 unless the movement of the disk is positively stopped by external means, whereupon the movement of the pinion continues independently of the disk. Said pinion 133 meshes with a gear segment 135 carried upon the underside of the gear 52, and said segment has a predetermined length and number of teeth to rotate the pinion through slightly more than one revolution for each revolution of the gear 52.

The pinion 133 has associated therewith a thin plate 136 which carries on its upper surface a housing 137 for a spring-pressed plunger 138 which is resiliently engaged with the teeth of the pinion 133. Thus, as the gear 52 rotates, the left-hand end of the segment 135 (Fig. 3) engages the housing 137 and forces it with the interlocked pinion 133 counterclockwise until the teeth of the segment 135 mesh with the teeth of the pinion. Thereupon the segment rotates the pinion, causing the housing 137 to rotate about the pin 132 until the housing is brought into engagement with the rear end of the segment 135 which arrests its movement and causes the plunger 138 to be retracted against its spring to permit continued rotation of the pinion by the gear segment. But as the gear segment continues in its movement, it allows the housing to follow the rear end of said segment into its original position with the plunger 138 in engagement with the pinion teeth.

The purpose of this arrangement is to always align the teeth of the pinion 133 with the teeth of the segment 135 so that they will will not clash. It will also be noted that the plate 136 is freely rotated about the pin 132 independently of the pinion 133, and the pinion 133 is permitted to frictionally rotate independently of the disk 131.

The disk 131 is locked in position during the record changing operation and record reproduction by the engagement of a spring-pressed plunger 139 mounted in a housing 140 forming a portion of the bearing for the shaft 40. Said plunger carries a downwardly-extending pin 141 in position to be engaged by a lip 142 on a cam 143, which cam is mounted on the gear 52. The plunger 139 is normally spring pressed into engagement with one of the notches 144 of the disk 131 so as to normally lock said disk against rotation.

As the gear 52 is caused to rotate during the transfer of a record, the lip 142 of cam 143 engages pin 141 to retract the plunger 139 which unlocks the disk 131 to permit it to rotate with the pinion 133, said pinion frictionally driving it when it is unlocked. Upon the lip 142 passing the pin 141, the plunger 139 is spring pressed into engagement with the peripheral edge of the disk 131 so as to drop into the next notch and arrest its movement regardless of the continued movement of the pinion 133.

The gear segment 135 and the lip 142 of the cam 143 are of such length and arrangement as to periodically rotate the disk 131 one complete revolution plus one notch. Thus, upon each operation, the disk 131 is arrested and locked in position one notch beyond its previous position, said disk being rotated in a counterclockwise direction. The result thereof, as will be hereinafter described, is that if there is no manual selection of the records by the selector, the disk 131 through the link 130 will move the record magazine 24 from the position of the reproduced record through one complete cycle and beyond to the position of the next record. Thus, wherein there are ten records in the magazine, it will be noted that there are ten notches on each side of the disk 131. Said notches are so spaced as to compensate for the varying angular positions of the link 130 so that when said disk is locked by the plunger 139 engaging a notch 144, the link 130 will so position the magazine that a certain record corresponding to that notch would be positioned for transfer to the turntable.

The purpose of the two sets of notches on the disk 131 is that the magazine will be positioned and locked thereby in such a manner that the records will be reproduced in succession in one direction of magazine movement and again will be reproduced in succession in the opposite direction. Thus, the records will be played in their order of one to ten, and then played in their order of ten to one. But the movement of the magazine, as well as the disk, makes a complete cycle of movement between the transfer of each successive record.

The hangers 126, upon which the magazine carriage is slidable, carry a bottom plate 150 having a plurality of recesses 151, one for each compartment in the magazine. Slidably mounted in each of said recesses, there is a pin 152 to which is connected a flexible piano wire 153 slidable in a flexible cable 154 having one end thereof extending through the plate to the recess 151 and secured in position by a screw 155. The end of the piano wire is connected with the pin 152. On the lower end of the member 25 an arm 156 is keyed so as to be rigidly mounted against lateral movement, but yieldingly mounted by the spring 157 to permit vertical movement. Said arm 156 has a downwardly-extending ear 158 straight on the forward edge but beveled on the rear edge. This arrangement is such that when the link 130 moves the magazine carriage and member 25 forwardly (Fig. 5), or to the left (Fig. 3), the straight side of the ear 158 engages the pin 152 and prevents further movement in that direction. Thus, the pin 152 arrests the forward movement of the magazine carriage in position for a predetermined record to be removed therefrom, such arresting movement causing the pinion 133, which continues its cycle, to frictionally slide with respect to the arrested disk 131, which is locked in such arrested position by the plunger 139. However, a movement in the opposite direction of the carriage by the link 130 is freely permitted, since the beveled side of the ear 158 will ride up over the pin 152, as shown in dotted lines in Fig. 5.

After the magazine has been thus positioned by the pin 152, and the corresponding record reproduced and replaced in the magazine, the manipulation of the tone arm through the lever 84 actuates a swinging yoke 159 through a pin 160 which is permitted to strike an extension 161 of the yoke to press the same upwardly against a lever plate 162. Said lever plate is pivotally mounted at 163 upon an extension of the member 25 and has a cam face 164 which is directly in alignment with the exposed end of the pin 152 representing the record being reproduced. The horizontal portion of the yoke 159 rides in a longitudinal slot 165 of said lever so that when the yoke is forced upwardly, it tilts the lever to the position shown in dotted lines (Fig. 5), causing the face 164 to engage the end of the pin 152 and return it to inoperative position.

*Record selector*

Figure 1:
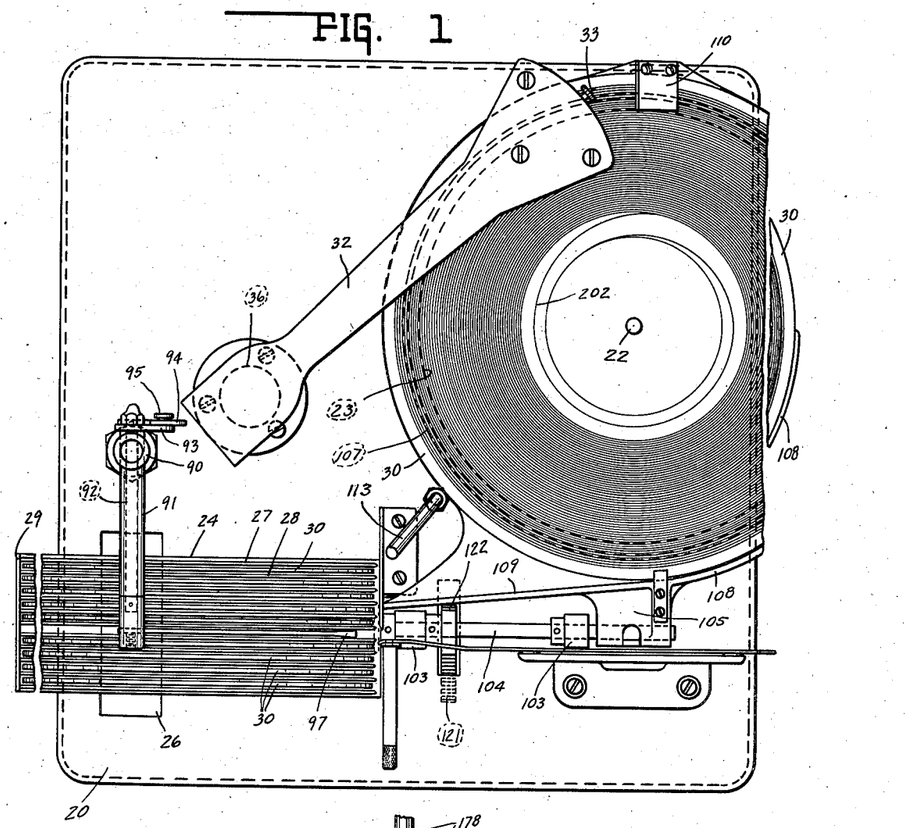
Fig. 1 is a plan view showing the relative positions of the playing turntable, storage magazine and pick-up arm during reproduction of a record.
Figure 4:
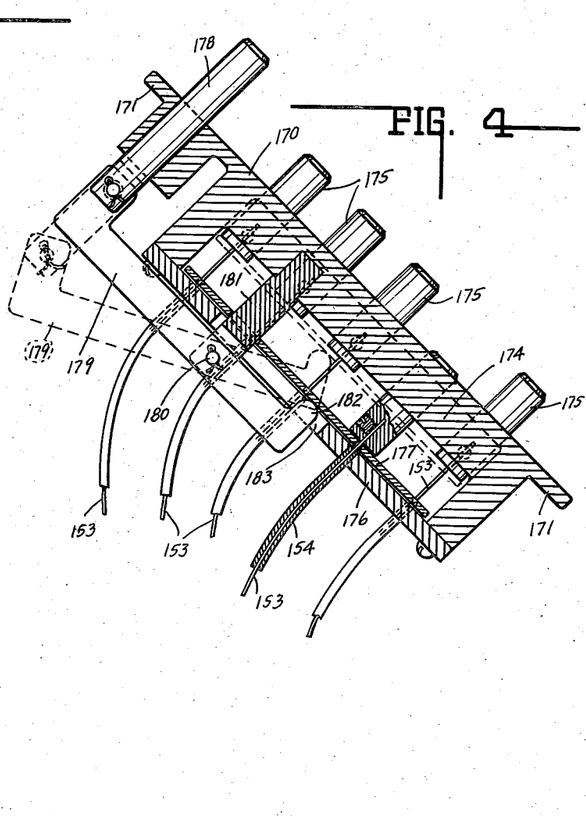
Fig. 4 is a central vertical section through the selector with one selecting button operating.
Figure 5:
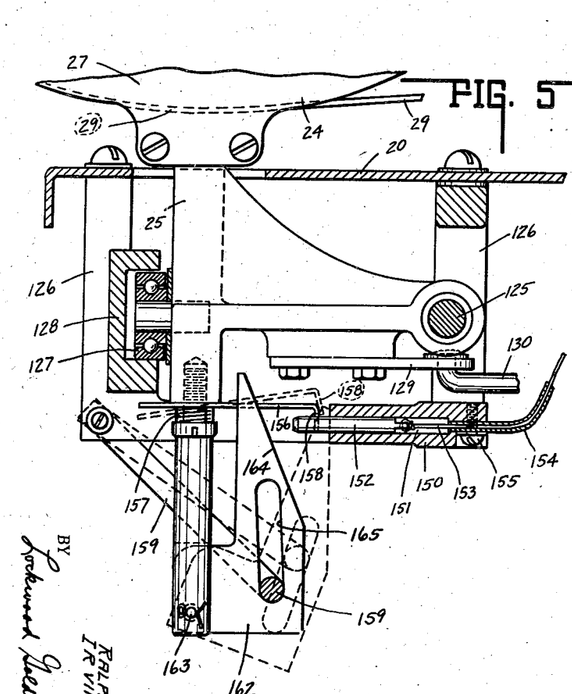
Fig. 5 is a horizontal section through the selecting mechanism with the said one button operated.
Figures 6, 7:
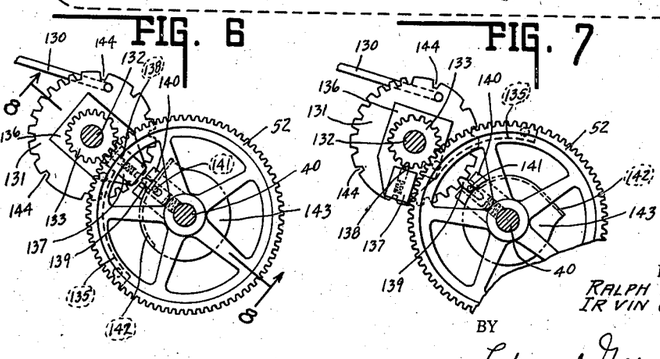
Fig. 6 is a plan view showing the position of the magazine moving mechanism at the beginning of its cycle.
Fig. 7 is the same as Fig. 6, showing the same mechanism at the completion of its cycle.
Figure 9:
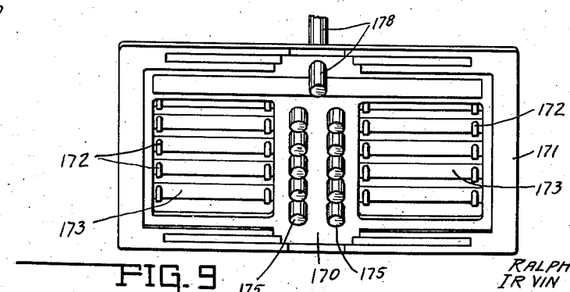
Fig. 9 is a top plan view of the remotely positioned selector.

The record selector, as illustrated at the bottom of Fig. 1 showing the plan view thereof, and in Fig. 4 showing a sectional view, comprises a plate 170 which is secured preferably on the top of the cabinet, remote from the selecting mechanism illustrated in Fig. 5. The plate is provided with the flanges 171 for supporting it in position, and is preferably set at an angle, as illustrated in Fig. 4, for convenience of observation by the user or operator. Said plate is provided with a plurality of tongues 172 for securing name cards 173 indicating the name of a record contained in the magazine. Slidably mounted in suitable apertures provided in a block 174, there are push buttons 175. Each of said push buttons is positioned opposite the name card. The piano wire 153, as above described, has one end connected to the pin 152 and has its other end rigidly secured to one of said push buttons. Thus, each push button 175 is mechanically connected with a corresponding pin 152 at a remote position. By pushing one of the push buttons downwardly in the block 174, the corresponding pin 152 to which it is connected is forced outwardly to a position shown in Fig. 5, so as to arrest the movement of the magazine at a predetermined position. Thus, if it is desired to reproduce a record indicated by name on a card 173, the push button opposite said card is pushed down, the corresponding pin 152 is pushed out, and the movement of the magazine by the link 130 is arrested by said pin so that the corresponding record lies in the plane of the finger 97 for transfer to the turntable.

Slidably mounted in the selector between the block and the bottom plate 176, there is a retracting plate 177 provided with apertures through which piano wires 153 freely extend. When one or more push buttons 175 are forced downwardly, the plate 177 is carried therewith to a position against the bottom plate 176. To retract the push buttons and the corresponding pins 152, there is provided a retracting button 178 slidable in the plate 170 and pivotally connected with a lever 179 fulcrumed at 180 to a boss 181, and having a lip 182 engaging the underside of the retracting plate 177 through a slot 183 in the bottom plate 176. When one or more of the buttons 175 is compressed, it forces the plate 177 downwardly and through the lever 179 forces the retracting button 178 upwardly, as shown in Fig. 4. Thus, if a button is improperly actuated, the retracting button 178 may be employed to return it to normal position, which acts likewise to retract the pin 152. However, if a record is reproduced, as selected by one of the buttons 175, the lever 162 on the selecting mechanism will automatically retract the pin 152 and through the connecting piano wire 153 will retract the corresponding button without affecting the retracting button 178.

*Electrical control switches*

For energizing the magnet 41 to start the record changing operations, there is provided a pair of leaf contactors 192 mounted on a base 193 secured to the deck plate 20 and suitably insulated from each other. An arm 194 is freely mounted upon the sleeve 36 and has engaging the upper surface thereof a friction washer preferably formed of cork. A collar 196 is secured to the sleeve 36 above the washer and is properly positioned to press the washer against the arm 194 with sufficient pressure to cause the arm normally to move with the movement of the sleeve. However, said pressure is not sufficient to prevent the arm 194 from being mechanically moved relative to said sleeve. The arm 194 has a finger 197 movable through a slot 198 in the deck plate 20 and adapted to strike one of the contact members 192 to make contact between said members. The arm 194 also has a finger 199 extending beneath the deck plate 20 to a position opposite a pin 200 carried upon the under surface of the hub 201 of the turntable.

By means of this arrangement, as the stylus moves inwardly, the arm 194 approaches members 192. The inward movement of the stylus is very slight for each revolution of the record, but as the finger 197 approaches members 192, finger 199 reaches the path of travel of pin 200. At each revolution of the turntable, pin 200 strikes finger 199, moving arm 194 backwardly against the friction of the washer sufficient to prevent engagement with members 192. When the stylus reaches the terminal groove 202, the arm 194 is quickly moved forward a greater distance than on any previous revolution. The finger 197 thereupon strikes member 192 before finger 199 can be struck by pin 200, causing a momentary contact between members 192. This momentary contact energizes solenoid 41 by a circuit not shown herein, but as set forth in the above-mentioned application.

*Operation of record selector and selecting mechanism*

As is indicated in Fig. 3, the selecting mechanism is supported below the deck plate 20 with the rest of the automatic phonograph operating mechanism. As a rule, this position is about midway between the top and bottom of a phonograph cabinet, as is well understood. The selector may be remotely positioned with respect thereto and preferably is mounted near the top of the cabinet so that it may be conveniently viewed and operated for selection of a record. The piano wires 153 in their flexible cables 154 may pass through the wall or behind the lining of the cabinet out of sight.

Assuming that there are ten records in the magazine, as herein shown, there are accordingly provided ten name cards 173 designating each record, and ten push buttons, each positioned opposite the name card. Each push button is remotely connected with its individual pin 152, there being ten corresponding pins extending in a row and in the same plane in the selecting mechanism. The position of each pin 152 corresponds with the position of each corresponding record in the magazine so that when the magazine is moved to a predetermined position with respect to a selected pin 152, the corresponding record will lie in the plane of the finger 97.

Assuming that the operator desires to play three records, he selects the three by pushing the proper three buttons 175. If he changes his mind, and wishes to select a different record of the three, he pushes the retractor button 178, which returns all three buttons and permits him to make a new selection. Assuming that he has again selected another group of three records and pushed the buttons, the corresponding pins 152 will be projected into the path of the arm 156. Upon the phonograph being started, the gear 52 is driven as above described, which causes the cam 143 to unlock the disk 131. The end of the segment gear 135 engages the housing 137 rotating the pinion 133, the rotation of which is continued by the gear segment 135. Through the friction engagement between the pinion 133 and the disk 131 which has been unlocked, it is caused to rotate. Its rotation reciprocates the magazine 24 through the link 130. The magazine is caused to move forward (to the left in Fig. 3), until the arm 156 engages the first pin 152 extending in its path. Upon engagement with said pin, the magazine stops in that position, which likewise stops the further rotation of the disk 131. The pinion 133, however, continues to move and the cam 143 permits the plunger 139 to enter one of the notches 144, thus locking the disk and magazine against further movement and holds it in the exact position in which it was arrested by the pin 152, which is the position in which the desired selected record lies in the plane of the finger 97. The selecting mechanism has, therefore, come to rest and the record changing mechanism continues to operate as above described, whereby the finger 97 rolls the selected record from the magazine into the cradle, which lowers the record into playing position upon the turntable.

Upon completion of the selected record, the tone arm is elevated to remove it therefrom, as above described, through the lever 84, which swings the cradle 159 in the position shown by dotted lines in Fig. 5, which tilts the lever 162 forwardly to retract the pin 152 and the corresponding push button 175.

Assuming that the pin 152 of the selection next called for is behind the pin first operated, the disk 131 again moves the magazine to the left until it reaches the extreme position, reverses it so as to carry it to the right (Fig. 3) to its extreme position, and then again to the left until the lever 156 strikes the first projected pin 152. In the movement of the magazine to the right, the beveled side of the arm 156 is permitted to slide over the projected pin 152 so that said pin has no effect upon the movement of the magazine toward the right but only arrests its movement toward the left. As indicated in Fig. 3, if the magazine is at rest at record No. 4, and the operator selects records Nos. 2, 6 and 9, the next operation of the machine will be to move the magazine from No. 4 to No. 2 position where it will be arrested and No. 2 record played. Thereupon, it will be moved forward to No. 1 position, back to No. 10, with the arm 156 sliding over pins 152 at their No. 6 and No. 9 positions, and then moved forward until the lever strikes the pin at No. 9 position. Thereupon record No. 9 will be played. The next movement will be again forward and No. 6 record will be played.

In event the machine is operated without any of the buttons being pushed down with the magazine having played No. 6 record, the magazine will be moved to No. 1 position, back to No. 10, and then back to No. 5. Thus it will make one complete cycle and in addition thereto will move forward one position. After playing No. 5 record, it will make the same cycle but stop at No. 4 position. After it plays No. 1 record, it will make the complete cycle, but move back again to No. 2 record, then No. 3, No. 4, etc. After it plays No. 10 record, it will make a complete cycle and move forward to the next record, No. 9, No. 8, No. 7, etc.

This is accomplished by reason of the fact that the lip 142 on the cam 143 is of such length that the disk 131 is permitted to make one complete revolution, corresponding to one complete cycle of the magazine, and move slightly beyond its single revolution so that the plunger 139 is released by the cam lip to engage the notch 144 following the notch which it had previously engaged, thus moving the magazine one position further than a complete cycle.

As will be noted in Fig. 3, there are two sets of ten notches each in the disk 131, indicated as group A and group B. As illustrated in said figure, the group B notches are being engaged by the plunger 139. During latching of this series of notches, and assuming that no buttons 175 are operated, the magazine will be moved to its extreme left position, then to the extreme right position and again to the left, coming to rest at the next succeeding station to the left of the previous station. Thus, if the record at station 5 has been reproduced, the magazine will move in the following sequence of stations,—Nos. 4, 3, 2, 1, 2, 3, 4, 5, 6, 7, 8, 9, 10, 9, 8, 7, 6, 5, and come to rest at station No. 4.

Wherein the series A notches are brought into position to be latched by the plunger 139, the movement will be the reverse. Thus, if No. 5 record has been played, the movement of the magazine will be first to the right, then to the left, and again to the right. It will move past the stations in the following order: stations Nos. 6, 7, 8, 9, 10, 9, 8, 7, 6, 5, 4, 3, 2, 1, 2, 3, 4, 5, and come to rest at station No. 6.

When the latching occurs in one series, the corresponding end station will be repeated while the opposite end station will not be repeated.

The invention claimed is:

1. In a record changing phonograph, the combination with a movable record magazine, means for moving said magazine, a turntable, a reproducer, and means for transferring a record from the magazine to the turntable in position to be engaged and reproduced thereon, of a record selecting mechanism comprising a movable carriage for said magazine, a housing fixedly mounted on said phonograph having a plurality of movable pins adapted to be moved into the line of travel of said carriage, means for moving the selected pin into said line of travel, means on said carriage for engaging said pin when the carriage is moved in one direction for arresting it in position for the transfer of a selected record and for escaping said pin when moved in the opposite direction, and means movable with said carriage for retracting said pin to inoperative position upon reproduction of the selected record.

2. In a record changing phonograph, the combination with a movable record magazine, means for moving said magazine, a turntable, a reproducer, and means for transferring a record from the magazine to the turntable in position to be engaged and reproduced thereon, of a record selecting mechanism comprising a carriage movable with said magazine, a housing associated with said carriage fixed to the phonograph, a plurality of slidable pins extending in alignment in said housing adapted to be selectively moved to exposed position and retracted to unexposed position, an arm on said carriage adapted to engage an exposed pin for arresting the movement thereof in a position to transfer a selected record when the carriage moves in one direction and slide over said pin when the carriage moves in the opposite direction, and a lever actuated by the reproducer for engaging and retracting the carriage arresting pin after arresting and positioning said carriage.

3. In a record changing phonograph, the combination with a turntable, and a reproducer, of a magazine member for supporting a plurality of records, a member for transferring a record from said magazine member to the turntable at a record transfer station, a rotating disk having peripheral projections corresponding with the respective record transfer stations, means for rotating said disk, means for connecting said disk with one of said members for driving it from one record transfer station through substantially a complete cycle of movement after each record transfer operation, a latch normally in engagement with a projection on said disk for arresting and locking it and said member against movement at a predetermined station, a cam, and means for driving it in timed relation with said disk for disengaging said latch to permit a substantially complete cycle of movement of said disk and member, said cam being formed to cause the said latch to engage a projection once removed from the previously engaged projection for arresting said member in record transfer position at one station removed from its previous station.

4. In a record changing phonograph, the combination with a movable record magazine, a turntable, and a reproducer, of mechanism for transferring a record from the magazine to the turntable when the magazine is positioned at a record transfer station, a rotating member, means connecting said member with said magazine for moving it relative to said record transfer mechanism, a plurality of projections on said member, and a latch actuated in timed relation with said record transfer mechanism for engaging the projection once removed from the preceding projection engaged thereby for arresting the movement of the magazine in record transfer position at one station removed from its previous station.

5. In a record changing phonograph, the combination with a movable record magazine, a turntable, and a reproducer, of mechanism for transferring a record from the magazine to the turntable when the magazine is positioned at a record transfer station, a rotating disk having a series of projections on opposite peripheral sides thereof, each series including a projection corresponding with a record transfer station, a link connected with said magazine and the periphery of said disk, means for rotating said disk in timed relation with the record transfer mechanism, a friction clutch between said rotating means and disk, a latch positioned to engage one of said projections and arrest the movement of said disk, and a cam driven by said record transfer mechanism for causing the latch to disengage the projection for permitting rotation of the disk and movement of the magazine thereby, said cam being so timed as to permit said latch to engage the projection once removed from the previously engaged projection upon said disk making substantially one complete rotation whereby said magazine will be moved thereby after each record transfer operation through substantially one complete cycle of movement to record transfer position at one station removed from its previous station.

6. In a record changing phonograph, the combination with a record magazine, a turntable, a reproducer, and means for transferring a record from the magazine to the turntable in position to be engaged and reproduced thereon, of a record selecting mechanism comprising a movable carriage, a plurality of movable pins adapted to be moved into line of travel of said carriage, means for moving a selected pin into said line of travel, means on said carriage for engaging said pin when the carriage is moved in one direction for arresting it in position for the transfer of a selected record and for escaping said pin when moved in the opposite direction, and means movable with said carriage for retracting said pin to inoperative position.

7. In a record changing phonograph, the combination with a turntable, and a reproducer, of a magazine member for supporting a plurality of records, a member for transferring a record from said magazine member to the turntable at a record transfer station one of said members being movably mounted relative to the other member and said turntable, a rotating element, an operative connection between said rotating element and one of said members for moving it from a record transfer station through substantially one complete cycle of movement after each record transfer operation, and a latch actuated in timed relation with the movement of said member for engaging said element and resisting further movement of said member one station removed from the previous transfer station.

8. In a record changing phonograph, the combination with a turntable and a reproducer, of a magazine member for supporting a plurality of records, a member for transferring a record from said magazine member to the turntable at a record transfer station, one of said members being movably mounted on said phonograph relative to the other member and said turntable, a rotatable disk having a plurality of locking positions, means for rotating said disk, an operative connection between said disk and one of said members for moving such member from the record transfer station through substantially one complete cycle of movement after each record transfer operation, a latching member, and means for moving said latching member into locking engagement with said disk upon said disk rotating to one locking position removed from a complete revolution for arresting the movement of said member in record transfer position at one station removed from its previous station.

RALPH R. ERBE.
IRVIN C. HUNTER.